US007806106B2

(12) United States Patent
Cinpinski et al.

(10) Patent No.: US 7,806,106 B2
(45) Date of Patent: Oct. 5, 2010

(54) FUEL INJECTOR FLOW CORRECTION SYSTEM FOR DIRECT INJECTION ENGINES

(75) Inventors: Kenneth J. Cinpinski, Ray, MI (US); Donovan L. Dibble, Utica, MI (US); Scot A. Douglas, Howell, MI (US); Joseph R. Dulzo, Novi, MI (US); Byungho Lee, Ann Arbor, MI (US)

(73) Assignee: GM Global Technology Operations, Inc.

( * ) Notice: Subject to any disclaimer, the term of this patent is extended or adjusted under 35 U.S.C. 154(b) by 63 days.

(21) Appl. No.: 12/370,855

(22) Filed: Feb. 13, 2009

(65) Prior Publication Data

US 2010/0206269 A1 Aug. 19, 2010

(51) Int. Cl.
*F02M 33/03* (2006.01)
*G01M 19/00* (2006.01)

(52) U.S. Cl. ....................... 123/446; 123/447; 123/478; 123/497; 73/114.48; 73/114.51; 701/103; 701/104

(58) Field of Classification Search ................. 123/446, 123/447, 357, 478, 480, 497; 73/114.41, 73/114.48, 114.51, 114.49; 701/103, 104, 701/114

See application file for complete search history.

(56) References Cited

U.S. PATENT DOCUMENTS

| | | | | |
|---|---|---|---|---|
| 5,535,621 | A * | 7/1996 | Glidewell et al. | 73/114.49 |
| 5,537,972 | A * | 7/1996 | Beck et al. | 123/198 DB |
| 6,439,201 | B1 * | 8/2002 | Gillis et al. | 123/458 |
| 6,732,715 | B2 * | 5/2004 | Fallahi et al. | 123/480 |
| 6,935,580 | B2 * | 8/2005 | Azam et al. | 239/533.5 |
| 7,007,676 | B1 * | 3/2006 | Schuricht et al. | 123/479 |
| 7,431,017 | B2 * | 10/2008 | Gibson | 123/446 |
| 7,552,717 | B2 * | 6/2009 | Dingle | 123/480 |
| 7,650,779 | B2 * | 1/2010 | Puckett et al. | 73/114.41 |
| 7,717,088 | B2 * | 5/2010 | Thomas | 123/478 |
| 2009/0056675 | A1 * | 3/2009 | Thomas | 123/478 |

* cited by examiner

*Primary Examiner*—Thomas N Moulis

(57) ABSTRACT

A fuel control system for an engine includes a control module that includes a fuel rail pressure module and a comparison module. The fuel rail pressure module determines a first fuel rail pressure of a fuel rail after a first event and a second fuel rail pressure of the fuel rail after a second event. The first event includes N conditions, a first of the N conditions comprises deactivation of a fuel pump of the engine, and N is an integer. The second event includes M conditions, a first of the M conditions comprises activation of a fuel injector, and M is an integer. The comparison module adjusts a fuel injector constant of the fuel injector based on the first fuel rail pressure, the second fuel rail pressure, and an injector activation period corresponding to the second event.

20 Claims, 4 Drawing Sheets

FUEL INJECTOR FLOW CORRECTION SYSTEM FOR DIRECT INJECTION ENGINES

FIELD

The present disclosure relates to engine control systems for internal combustion engines and more particularly to fuel injector monitoring and control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engine systems include an engine that combusts an air/fuel mixture within cylinders to generate drive torque. Air is drawn into the engine through an intake and is then distributed to the cylinders. The air is mixed with fuel and the air/fuel mixture is combusted. A fuel system typically includes a fuel rail that provides fuel to individual fuel injectors associated with the cylinders. One or more of the fuel injectors may be utilized to deliver fuel to the engine during a given time period.

A period of time that the fuel injectors are energized is referred to as a pulse-width (PW). Typically, the pulse-width for each of the fuel injectors is determined based on a determined quantity (e.g., mass) of fuel, size of the fuel injectors (i.e. fuel flow capacity), and pressure of the fuel supplied.

Direct injected (DI) engines supply fuel directly to an engine's cylinders. DI engines generally tend to operate at a higher pressure than other types of engines, such as port fuel injected (PFI) engines.

Over time, fuel injector coking can occur. Fuel injector coking refers to the accumulation of deposits on an orifice of a fuel injector. Fuel injector coking often occurs in a non-uniform fashion across the fuel injectors. As a result of coking, discharge coefficients of fuel injectors and the corresponding flow of fuel out of the injectors may be adversely affected. This may reduce fuel efficiency.

SUMMARY

In one embodiment, a fuel control system for an engine is provided that includes a control module. The control module includes a fuel rail pressure module and a comparison module. The fuel rail pressure module determines a first fuel rail pressure of a fuel rail after a first event and a second fuel rail pressure of the fuel rail after a second event. The first event includes N conditions, a first of the N conditions comprises deactivation of a fuel pump of the engine, and N is an integer. The second event includes M conditions, a first of the M conditions comprises activation of a fuel injector, and M is an integer. The comparison module adjusts a fuel injector constant of the fuel injector based on the first fuel rail pressure, the second fuel rail pressure, and an injector activation period corresponding to the second event.

In other features, a method of fuel control for an engine is provided. The method includes detecting a first fuel rail pressure after a first event that includes N conditions, where N is an integer. A first of the N conditions includes deactivation of a fuel pump of the engine. A second fuel rail pressure is detected after a second event that includes M conditions, where M is an integer. A first of the M conditions includes activation of a fuel injector. A first fuel rail pressure difference for an injector is calculated based on a comparison between the second fuel rail pressure and the first fuel rail pressure. A second fuel rail pressure difference is calculated based on a comparison between a reference rail pressure and the first fuel rail pressure. A fuel injector constant of a fuel injector is adjusted based on a comparison between the first fuel rail pressure difference and the second fuel rail pressure difference.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present disclosure will become more fully understood from the detailed description and the accompanying drawings, wherein.

DETAILED DESCRIPTION

The following description is merely exemplary in nature and is not intended to limit the present disclosure, application, or uses. As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
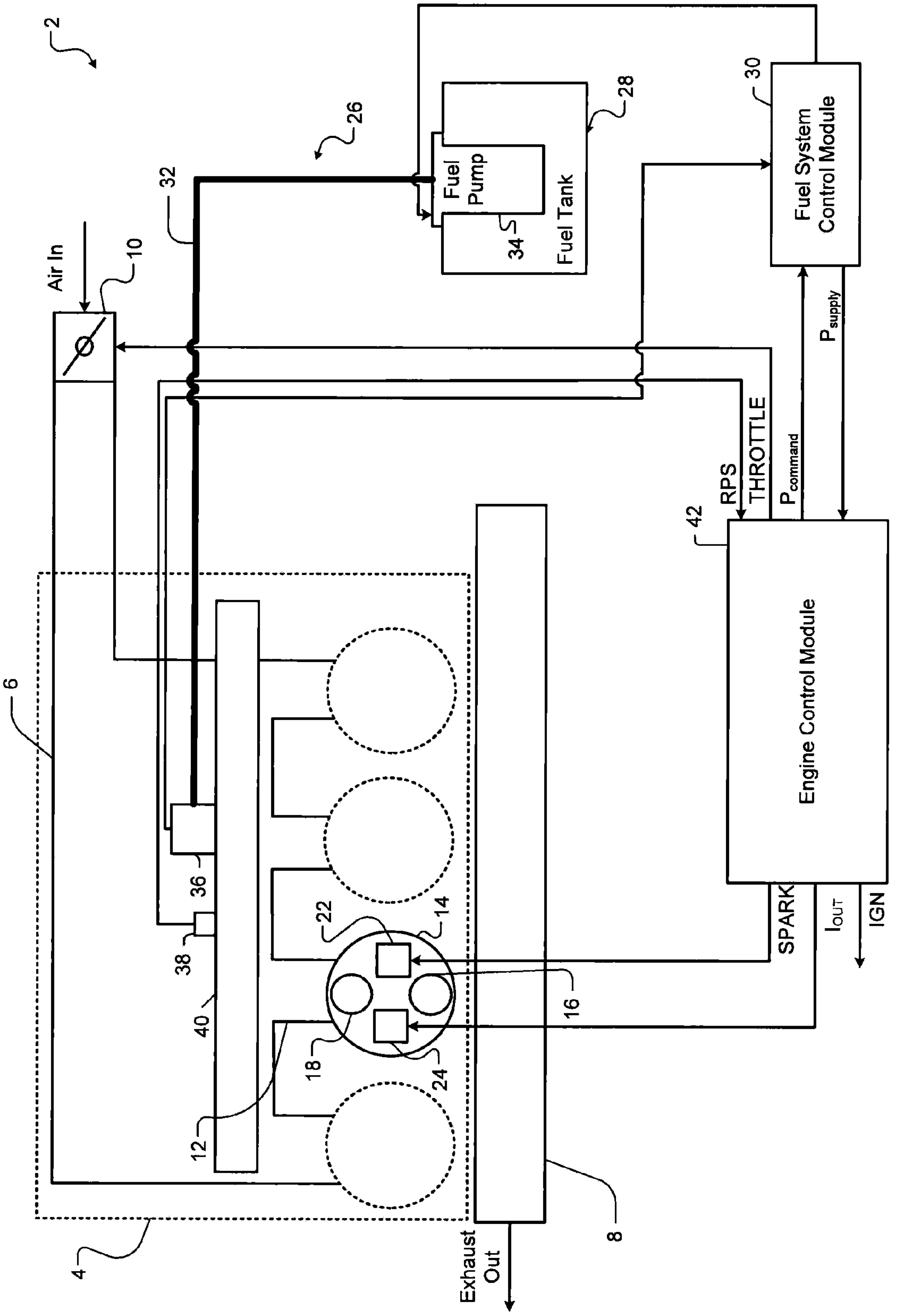
FIG. 1 is a functional block diagram of an exemplary engine system according to the principles of the present disclosure.

Referring now to FIG. 1, an exemplary engine system 2 is illustrated. The engine system 2 includes an engine 4, which has an intake manifold 6, an exhaust manifold 8, and a throttle 10.

The intake manifold 6 distributes air among intake runners 12 and delivers the air to cylinders 14 via intake ports. The intake manifold 6 includes the intake runners 12, the cylinders 14, and the intake ports. The intake manifold 6 also includes intake valves 18 and ignition components. The ignition components include spark plugs 22, and may include an ignition coil and an ignition wire.

In operation, air entering the intake manifold 6 is distributed among the intake runners 12 and is delivered to the cylinders 14 via the intake ports. The flow of air from the intake ports into the cylinders 14 is controlled by the intake valves 18. The intake valves 18 sequentially open to allow air into the cylinders 14 and close to inhibit the flow of air into the cylinders 14. The air is mixed with fuel, which is injected using the respective fuel injectors 24, to form an air/fuel mixture within the cylinders 14. The injected fuel is timed using a camshaft or a belt driven system. The air/fuel mixture is ignited by the spark plugs 22. The air/fuel mixture is provided at a desired air to fuel ratio and is ignited to reciprocally drive pistons, which in turn drive a crankshaft of the engine 4.

The exhaust manifold 8 ejects the exhaust gas from the engine 4. In operation, combusted air within the cylinders 14 is selectively pumped into the exhaust manifold 8 via the exhaust ports by piston assemblies through exhaust valves 16. Exhaust air in the cylinders 14 is exhausted to the exhaust manifold 8 by sequentially opening the exhaust valves 16 in order to allow air to exit the cylinders 14. The exhaust valves 16 are also closed in order to inhibit air from exiting the cylinders 14.

Although four cylinders are shown, the embodiments disclosed herein may apply to an engine with any number of cylinders. One or more intake valves and one or more exhaust valves may be associated with each cylinder.

The engine system 2 further includes a fuel supply system 26. The fuel supply system 26 provides a controlled amount of fuel to the engine 4 via the fuel injectors 24. The fuel supply system 26 includes a fuel tank assembly 28, a fuel system control module 30, a fuel supply line 32, a low-pressure fuel pump 34, a high-pressure fuel pump 36, a fuel rail pressure sensor 38, and a fuel rail 40.

The fuel tank assembly 28 supplies fuel from the low-pressure fuel pump 34 to the high-pressure fuel pump 36 via the fuel supply line 32. The low-pressure fuel pump 34 is fluidly coupled to the fuel supply line 32 and to the high-pressure fuel pump 36. The high-pressure fuel pump 36 may be either a fixed displacement pump or a variable displacement pump that provides pressurized fuel to the fuel rail 40. As the fuel injectors 24 inject fuel into the respective cylinders 14, the high-pressure fuel pump 36 replenishes the pressurized fuel within the fuel rail 40. The high-pressure fuel pump 36 is mechanically driven by the engine 4.

The fuel supply system 26 further includes a fuel rail pressure sensor 38. The fuel rail pressure sensor 38 sends a fuel rail pressure signal to an ECM 42 to allow adjustments to the fuel injectors 24, when certain enabling criteria are met.

The adjustments to the fuel injectors 24 may include adjustments to one or more fuel injector constants. A fuel injector constant may refer to a flow rate of a fuel injector. An adjustment in a fuel injector constant alters the opening size of the injector, which can compensate for conditions such as coking. Coking of fuel injectors can be caused by a build-up of residue and may result in too little or too much fuel flow through an injector. When making adjustments to the fuel injectors 24 and when the fuel pressure sensor 38 is detecting the fuel rail pressure, the high-pressure fuel pump 36 is shut off. The high-pressure fuel pump 36 is shut off in order to allow the fuel rail pressure within the fuel rail 40 to stabilize. This prevents oscillations within the fuel rail 40.

Although four fuel injectors are shown, the embodiments disclosed herein apply to an engine with any number of fuel injectors. One or more of the fuel injectors 24 may be located at a position corresponding to one or more of the intake runners 12 to dispense fuel to one or more of the cylinders 14.

Figure 2:
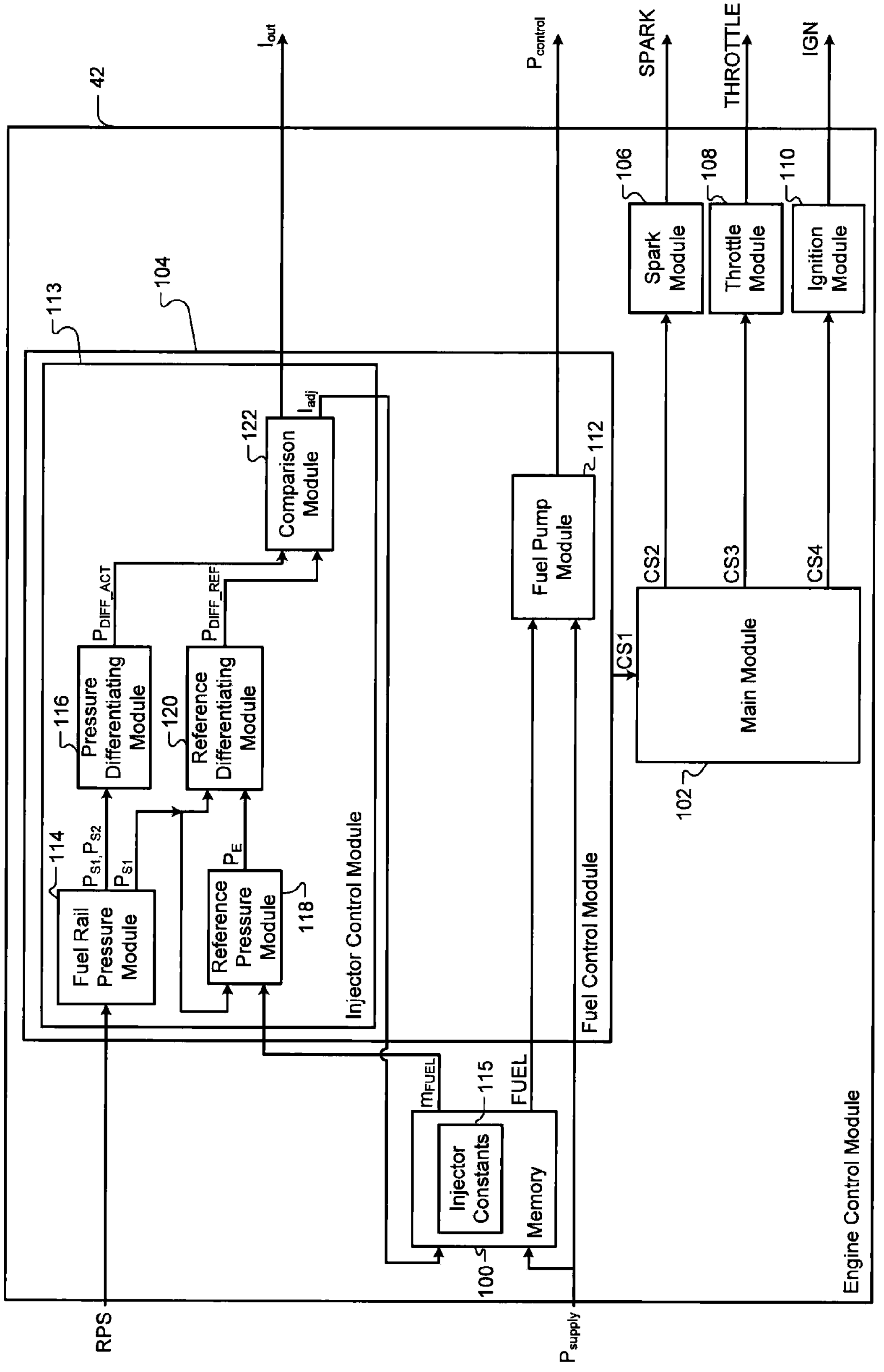
FIG. 2 is a functional block diagram of an exemplary engine control module according to the principles of the present disclosure.

Referring now also to FIG. 2, the ECM 42 controls the operation of the engine 4, particularly the fuel injectors 24, and assists in controlling the fuel supply system 26. The ECM 42 receives fuel system signals. The fuel system signals may include a fuel supply signal $P_{supply}$ generated by the fuel system control module 30 and a rail pressure signal RPS generated by the fuel rail pressure sensor 38. The ECM 42 may store one or more of the fuel system signals in memory 100 and may retrieve the fuel system signals for subsequent determinations by the ECM 42.

The ECM 42 may also generate fuel system commands based on determinations by the ECM 42. The fuel system commands may include: a throttle output THROTTLE; an injector output $I_{out}$; a spark output SPARK; an ignition output IGN; and a pump control output $P_{control}$. The ECM 42 may control the throttle 10, the fuel system control module 30, and the fuel injectors 24 based on the fuel system commands.

The ECM 42 may include memory 100, a main module 102, and a fuel control module 104. A command for fuel $m_{fuel}$ may be generated based on the fuel supply signal $P_{supply}$. The command for fuel $m_{fuel}$ and the fuel supply signal $P_{supply}$ may be stored in the memory 100. A comparison of fuel rail pressures may also be stored in the memory 100 based on an injector adjustment signal $I_{adj}$ from the fuel control module 104.

The main module 102 may control a spark control module 106, a throttle control module 108, and an ignition control module 110 based on the main control signal CS1 received from the fuel control module 104. The main module 102 may generate a spark control signal CS2, a throttle control signal CS3, and an ignition control signal CS4. The spark control module 106 may generate the spark output SPARK based on the spark control signal CS2. The throttle control module 108 may generate the throttle output THROTTLE based on the throttle control signal CS3. The ignition control module 110 may generate the ignition output IGN based on the ignition control signal CS4.

The fuel control module 104 may include a fuel pump module 112 and an injector control module 113. The fuel control module 104 may control the fuel flow of the fuel supply system 26 to the fuel injectors 24 based on the rail pressure signal RPS and the fuel supply signal $P_{supply}$. The fuel control module 104 may also control the fuel flow of the fuel supply system 26 based on predetermined fuel injector constants 115 stored in the memory 100.

The fuel pump module 112 may control the operation of the fuel supply system 26 based on the injector status signal FUEL and the fuel supply signal $P_{supply}$. The fuel pump module 112 may adjust the amount of the fuel commanded based on changes to the fuel injector constants 115, fuel injector activation periods, and/or fuel rail pressures stored in the memory 100. The fuel pump module 112 may generate the pump control output $P_{control}$.

The injector control module 113 may include a fuel rail pressure module 114, a pressure differentiating module 116, a fuel reference pressure module 118, a reference differentiating module 120, and a comparison module 122. The comparison module 122 may adjust the fuel injector constants 115 of one or more of the fuel injectors 24 based on the fuel rail pressure signals and injector activation periods of the fuel injectors 24. One or more of the fuel injectors 24 may have an injector constant, which may control the amount of fuel flowed by one or more of the fuel injectors 24. The fuel injector constants 115 may be adjusted based on differences between expected and actual fuel rail pressures. One or more of the fuel injectors may have the same injector constant or share a common constant.

The fuel rail pressure module 114 may determine the pressure in the fuel rail 40 based on the rail pressure signal RPS generated by the fuel rail pressure sensor 38. The fuel rail pressure module 114 may determine the pressure of the fuel rail 40 when the fuel in the fuel rail 40 is at a steady-state and before a "tip-in" of the throttle 10. The tip-in may refer to when an accelerator peddle is depressed and/or when the position of an accelerator peddle is adjusted. The speed of the engine 4 typically increases above an idle speed when a tip-in occurs. The fuel rail pressure module 114 may generate a first pressure signal $P_{S1}$ before an injector injects fuel. The fuel rail pressure module 114 may generate a second pressure signal $P_{S2}$ after the injector injects fuel.

The pressure differentiating module 116 may determine an actual pressure difference $P_{DIFF\_ACT}$ based the pressure signals $P_{S1}$ and $P_{S2}$. The reference pressure module 118 may determine an expected rail pressure $P_E$ based on the first pressure signal $P_{S1}$ and an injector activation period T. The reference pressure module 118 may determine the injector activation period T based on a command for fuel $m_{fuel}$.

The reference differentiating module 120 may determine a reference pressure difference $P_{DIFF\_REF}$ based on the first pressure signal $P_{S1}$ and the expected rail pressure $P_E$. The comparison module 122 may generate the injector output $I_{out}$ and the injector adjustment signal $I_{adj}$ based on the actual pressure difference $P_{DIFF\_ACT}$ and the reference pressure difference $P_{DIFF\_REF}$.

Figure 3:
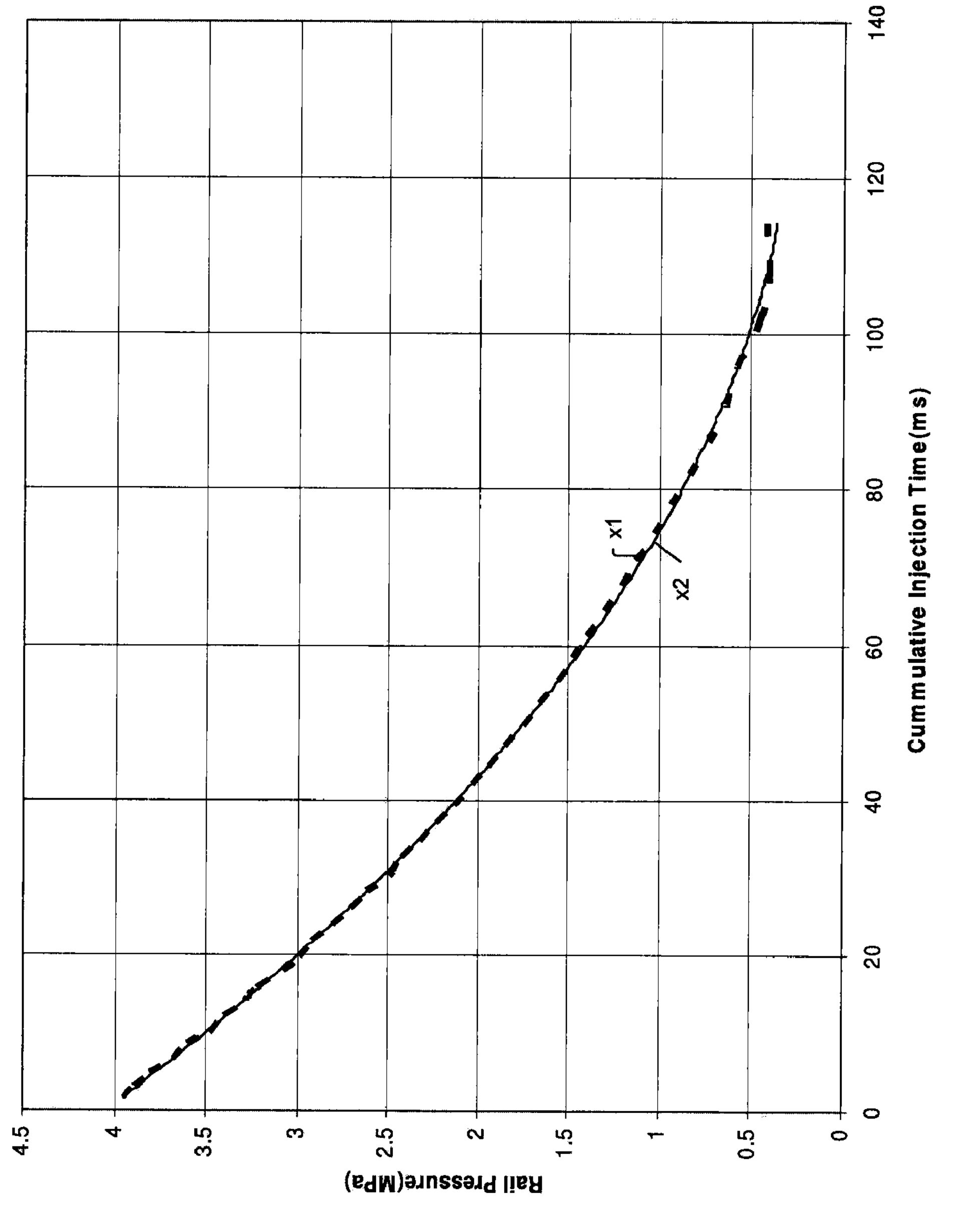
FIG. 3 is a graph illustrating an exemplary fuel rail pressure response according to an embodiment of the present disclosure.

Referring now also to FIG. 3, an exemplary graph illustrates an expected pressure response $x_1$ and a trend line $x_2$ of the expected pressure response $x_1$. The expected pressure response $x_1$ and the trend line $x_2$ may be represented in terms of mega-pascals (MPa) and milliseconds (ms). The reference pressure module 118 may adjust one or more fuel injector constants 115 based on the first pressure signal $P_{S1}$ and the command for fuel $m_{fuel}$. The reference pressure module 118 may determine the expected rail pressure $P_E$ based on, for example, equation (1).

$$P_E = P_{S1} - \Delta P_{ref} \quad (1)$$

$\Delta P_{ref}$ is the expected pressure drop between events. For example, when the first pressure signal $P_{S1}$ is 3.1 MPa and an expected pressure drop $\Delta P_{ref}$ is 1.6 MPa, then the expected rail pressure $P_E$ is 1.5 MPa. The actual values shown are exemplary and may change with different conditions.

Figure 4:
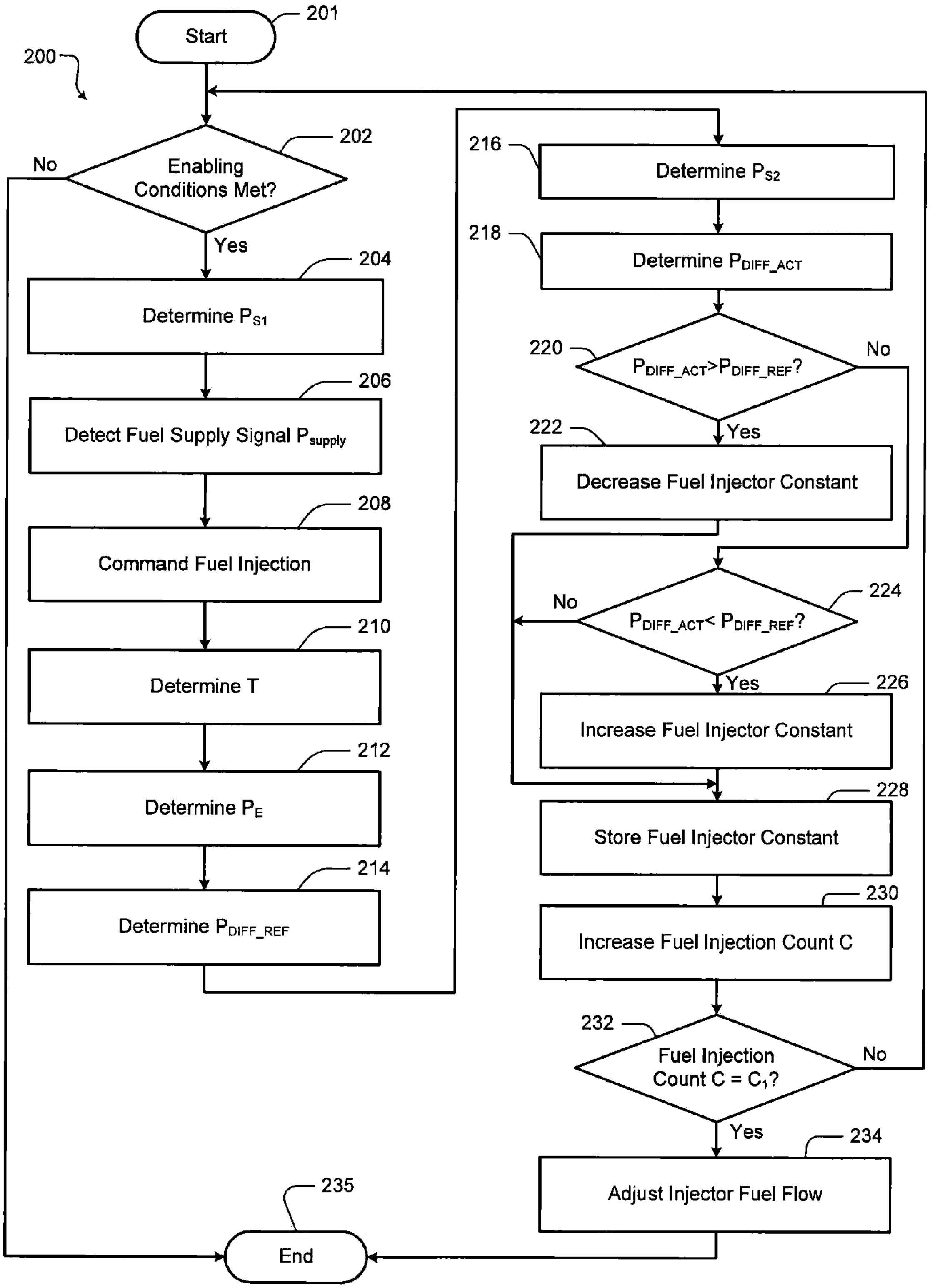
FIG. 4 is an illustration of an exemplary fuel injector control method according to the principles of the present disclosure.

Referring now to FIG. 4, an exemplary fuel injector control method 200 is shown. Although the following steps are primarily described with respect to the embodiment of FIGS. 1-3, the steps may be modified and/or applied to other embodiments of the present disclosure. The fuel injector control method 200 may be implemented as a computer program stored in the memory of an ECM, such as the ECM 42. The method may be activated when enabling criteria are met. Some example enabling criteria are described below. The fuel injector control method 200 may be implemented to determine one or more fuel injector constants of one or more fuel injectors. The fuel injector control method 200 may correct the fuel flow of one or more fuel injectors based on the one or more fuel injector constants.

The following steps may be performed iteratively. The fuel injector control method 200 may begin at step 201. In step 202, the ECM determines whether one or more enabling criteria are satisfied. The enabling criteria may include: an indication that an engine is operating in an idle state; an indication that the engine speed of an engine is within a predetermined range; reception and/or generation of the fuel supply signal $P_{supply}$; and/or a reception and/or generation of the fuel supply signal $P_{supply}$ during a tip-in of a throttle.

The enabling criteria may include two additional criterion: an indication that the fuel rail exceeds a predetermined fuel rail pressure; and an indication that a high-pressure fuel pump is stopped. The two criterion may correspond with the stabilization of pressure oscillations within the fuel rail.

The enabling criteria may also generally be satisfied when the high-pressure fuel pump, such as the high-pressure fuel pump 90 of FIG. 1, is in a deactivated state. A first event corresponds to one or more of the enabling criteria, including the deactivation of a fuel pump, such as the high-pressure fuel pump. When the high-pressure fuel pump is stopped, the fuel injector(s) and a low-pressure fuel pump continue to operate in order to meet the demands of the engine. In operation, the state of the high-pressure fuel pump and the low-pressure fuel pump may be communicated by a fuel system control module, such as the fuel system control module 76 of FIG. 1. The state of the fuel pumps and the command for fuel $m_{fuel}$ may be communicated by the fuel system control module based on the fuel supply $P_{supply}$ signal to the ECM. The ECM may communicate with the fuel system control module based on a pump control output $P_{control}$.

In step 204, initially, a fuel rail pressure module generates the first pressure signal $P_{S1}$. In subsequent injection cycles, the first pressure signal $P_{S1}$ corresponding to the fuel injector(s) may be based on a previous pressure sample of the same or different fuel injector(s). The previous pressure sample may be stored in memory. The previous pressure sample may be based on a previous injection cycle that corresponds to the same or different fuel injector(s) as the current first pressure signal $P_{S1}$. Alternatively, the first pressure signal $P_{S1}$ may be used as the previous pressure sample for the same or different fuel injector(s). The high-pressure fuel pump and the fuel injector(s) are in an inactive or deactivated state while the first pressure signal $P_{S1}$ is detected.

In step 206, the fuel system control module receives the fuel supply signal $P_{supply}$. The fuel supply signal $P_{supply}$ may be triggered based on a change in angle of an accelerator pedal.

In step 208, the fuel system control module commands fuel injection based on the fuel supply signal $P_{supply}$. The commanded fuel injection and the state of one or more of the fuel pumps may be stored in the memory. The fuel injectors are activated based on the fuel supply signal $P_{supply}$.

In step 210, a reference pressure module may determine an injector activation period T of one or more of the fuel injectors. The injector activation period T may be a predetermined injector activation period stored in the memory. The injector activation period T may represent an injector pulse-width of one or more of the fuel injectors. Alternatively, the injector activation period T may be based on the fuel supply signal $P_{supply}$. The fuel supply signal $P_{supply}$ may include a command for fuel $m_{fuel}$. The command for fuel $m_{fuel}$ may be predetermined and/or stored in the memory.

In step 212, the reference pressure module determines an expected rail pressure $P_E$ before or by the end of a first injection cycle of one or more of the fuel injectors. A second event corresponds to the activation of a fuel injector, such as during the injection cycle, the first pressure signal $P_{S1}$, the second pressure signal $P_{S2}$, and the injector activation period T. During the first injection cycle all, a group of, or one or more of the fuel injectors are activated corresponding to the injector activation period of the fuel injector(s). The reference pressure module determines an expected rail pressure $P_E$ based on the first pressure signal $P_{S1}$ and the command for fuel $m_{fuel}$.

Referring again to FIG. 3, using the command for fuel $m_{fuel}$, and a reference fuel injector constant $IC_{ref}$, the reference pressure module 118 of FIG. 2 determines a reference pulse-width $pw_{ref}$. The reference injector constant $IC_{ref}$ may be a predetermined value for one or more fuel injectors stored in the memory. The reference injector constant $IC_{ref}$ may be used as a fuel injector constant until a fuel injector constant is determined for one or more of the fuel injectors. The reference pulse-width $pw_{ref}$ may be determined based on equation (2).

$$pw_{ref} = m_{fuel} \times IC_{ref} \quad (2)$$

The reference pressure module determines the expected pressure drop $\Delta P_{ref}$ based on the reference pulse-width $pw_{ref}$. The reference pressure module may determine, calculate, or look-up the expected pressure drop $\Delta P_{ref}$. The expected pressure drop $\Delta P_{ref}$ may be determined via one or more tables. The reference pressure module may determine the expected rail pressure $P_E$ based on the above equation (1).

In step 214, a reference differentiating module determines the reference pressure difference $P_{DIFF\_REF}$. The reference pressure difference $P_{DIFF\_REF}$ may be determined based on the difference between the expected rail pressure $P_E$ and the first pressure signal $P_{S1}$.

In step 216, the fuel rail pressure module generates the second pressure signal $P_{S2}$. The fuel rail pressure module may generate the second pressure signal $P_{S2}$ after the first injection cycle. The second pressure signal $P_{S2}$ may also be generated before a subsequent iteration of the fuel injector(s). In the subsequent iteration, the second pressure signal $P_{S2}$ may be generated before the fuel injector(s) are activated a second time. The first pressure signal $P_{S1}$ may be used as a previous pressure sample to generate the pressure signal $P_{S2}$ for a second injection cycle. The second pressure signal $P_{S2}$ may be stored in the memory. The second injection cycle may be based on the injection of fuel by all, a group of, or one or more of the fuel injectors. The second injection cycle may correspond to the injector activation period of the fuel injector(s) and may occur after the first injection cycle.

Further in step 216, when the second pressure signal $P_{S2}$ is generated, the fuel injector(s) are active. The high-pressure fuel pump may be inactive while the second pressure signal $P_{S2}$ is detected. The second pressure signal $P_{S2}$ may also be detected after the second event. Subsequent to the generation of the second pressure signal $P_{S2}$, the high-pressure fuel pump may be activated for the second injection cycle. Alternatively, when there is an adequate amount of fuel and/or fuel pressure in the fuel rail for the second injection cycle, the high-pressure fuel pump may remain inactive.

In step 218, a pressure differentiating module determines an actual pressure difference $P_{DIFF\_ACT}$ for the first injection cycle. The actual pressure difference $P_{DIFF\_ACT}$ may be determined based on the difference between the first pressure signal $P_{S1}$ and the second pressure signal $P_{S2}$.

In step 220, a comparison module determines when the actual pressure difference $P_{DIFF\_ACT}$ is greater than the reference pressure difference $P_{DIFF\_REF}$. When the actual pressure difference $P_{DIFF\_ACT}$ is greater than the pressure difference $P_{DIFF\_REF}$, then the fuel injector constant(s) for the injector(s) may be decreased in step 222. The decreased fuel injector constant(s) may result in a reduced amount of fuel flow for the fuel injector(s) after a predetermined number of injection cycles. Additionally, the decreased fuel injector constant(s) may prevent and/or compensate for the over-supplying of fuel to the engine.

In step 224, the comparison module determines when the actual pressure difference $P_{DIFF\_ACT}$ is less than the reference pressure difference $P_{DIFF\_REF}$ for the fuel injector(s). When the actual pressure difference $P_{DIFF\_ACT}$ is less than the reference pressure difference $P_{DIFF\_REF}$, then the injector constant(s) for the fuel injector(s) may be increased in step 226. The increased fuel injector constant(s) may result in an increase fuel flow for the fuel injector(s) after a predetermined number of injection cycles. The increase in fuel flow may further minimize and/or prevent under-fueling to the engine. Further in step 224, the comparison module may determine that actual pressure difference $P_{DIFF\_ACT}$ may not be greater than the reference pressure difference $P_{DIFF\_REF}$. When this occurs, fuel flow of the fuel injector(s) may not be increased.

In step 228, adjustments in fuel injector constant(s) from step 222 or from step 226 are stored in the memory. Dedicated or shared fuel injector constant(s) may be stored in the memory.

In step 230, a fuel injection count C is incremented by one and stored in the memory. The fuel injection count C may represent the number of injection cycles that are performed.

In step 232, the fuel injection count C is compared to a preset count value $C_1$ previously stored in the memory. When the fuel injection count C is equal to the preset count value $C_1$, then the fuel flow for the fuel injector(s) is adjusted in step 234. Multiple injection cycles may occur before adjusting the fuel flow for the fuel injector(s). Multiple injection cycles may occur in order to determine the fuel injector constant(s) of the fuel injector(s).

In step 234, when the fuel injection count C is equal to the preset count value $C_1$, then an adjustment to injector fuel flow occurs. The adjustment to an injector fuel flow may be based on a current value of the fuel injector constant for the fuel injector(s). The current value of the fuel injector constant may be the reference injector constant $IC_{ref}$. The method 200 may end at step 235.

The above-described steps are meant to be illustrative examples; the steps may be performed sequentially, synchronously, simultaneously, continuously, during overlapping time periods or in a different order depending upon the application.

Those skilled in the art may now appreciate from the foregoing description that the broad teachings of the present disclosure may be implemented in a variety of forms. Therefore, while this disclosure includes particular examples, the true scope of the disclosure should not be so limited, since other modifications will become apparent to the skilled practitioner upon a study of the drawings, the specification and the following claims.

What is claimed is:

1. A fuel control system for an engine comprising:

a control module that comprises:

a fuel rail pressure module that determines a first fuel rail pressure of a fuel rail after a first event and a second fuel rail pressure of the fuel rail after a second event, wherein the first event includes N conditions, a first of the N conditions comprises deactivation of a fuel pump of the engine, and N is an integer, and wherein the second event includes M conditions, a first of the M conditions comprises activation of a fuel injector, and M is an integer; and a comparison module that adjusts a fuel injector constant of the fuel injector based on the first fuel rail pressure, the second fuel rail pressure, and an injector activation period corresponding to the second event.

2. The fuel control system of claim 1 wherein the fuel injector constant corresponds to at least one of deposit build-up in the fuel injector and flow rates of the fuel injector.

3. The fuel control system of claim 1 wherein a second of the N conditions comprises stabilization of pressure oscillations within the fuel rail.

4. The fuel control system of claim 1 wherein the comparison module adjusts the fuel injector constant based on a comparison between a first fuel rail pressure difference and a second fuel rail pressure difference that are determined based on the first fuel rail pressure.

5. The fuel control system of claim 4 wherein the comparison module determines the first fuel rail pressure difference based on a comparison between the second fuel rail pressure and the first fuel rail pressure.

6. The fuel control system of claim 4 wherein the comparison module determines the second fuel rail pressure difference based on a comparison between a reference rail pressure and the first fuel rail pressure.

7. The fuel control system of claim 6 wherein the comparison module determines the reference rail pressure based on a predetermined relationship between injector activation periods, fuel rail pressures for the fuel injector, and the injector activation period of the second event.

8. The fuel control system of claim 1 further comprising a fuel rail pressure sensor that generates a fuel rail pressure signal, wherein the fuel rail pressure module determines the first fuel rail pressure and the second fuel rail pressure based on the fuel rail pressure signal.

9. The fuel control system of claim 1 wherein the comparison module adjusts the fuel injector constant based on a position adjustment of an accelerator pedal.

10. The fuel control system of claim 1 wherein the fuel rail pressure modules determines the first fuel rail pressure and the second fuel rail pressure after fuel pressure oscillations in a fuel rail stabilize.

11. The fuel control system of claim 1, wherein the fuel rail pressure module determines the second fuel rail pressure after the second event and when the speed of the engine is within a predetermined range.

12. The fuel control system of claim 1, wherein the comparison module adjusts the fuel injector constant after a predetermined number of injection cycles.

13. A method of fuel control for an engine comprising:

detecting a first fuel rail pressure after a first event that includes N conditions, wherein a first of the N conditions comprises deactivation of a fuel pump of the engine and N is an integer;

detecting a second fuel rail pressure after a second event that includes M conditions, wherein a first of the M conditions comprises activation of a fuel injector and M is an integer;

calculating a first fuel rail pressure difference for the fuel injector based on a comparison between the first fuel rail pressure and the second fuel rail pressure;

calculating a second fuel rail pressure difference for the fuel injector based on a comparison between the first fuel rail pressure and a reference rail pressure; and adjusting a fuel injector constant of the fuel injector based on a comparison between the first fuel rail pressure difference and the second fuel rail pressure difference.

14. The method of claim 13 wherein adjusting the fuel injector constant corresponds to at least one of deposit build-up in the fuel injector and flow rates of the fuel injector.

15. The method of claim 13 wherein the first event is performed based on at least one of speed of the engine and a fuel supply signal.

16. The method of claim 13 wherein the first event is performed based on pressure in the fuel rail exceeding a predetermined fuel rail pressure.

17. The method of claim 13 wherein the first fuel rail pressure and the second fuel rail pressure are detected after fuel pressure oscillations in the fuel rail stabilize.

18. The method of claim 13 wherein the second fuel rail pressure is detected after the second event and when the speed of the engine is within a predetermined range.

19. The method of claim 13 wherein the fuel injector constant is adjusted after a predetermined number of fuel injection cycles.

20. The method of claim 13 further comprising activating the fuel pump of the engine after the detection of the second fuel rail pressure.

* * * * *